US012621242B2

(12) United States Patent (10) Patent No.: US 12,621,242 B2
Chauhan et al. (45) Date of Patent: May 5, 2026

(54) ELASTIC SCALING OF SOFTWARE-DEFINED DISTRIBUTED LOAD BALANCERS ACROSS CLOUDS

(71) Applicant: VMware LLC, Palo Alto, CA (US)

(72) Inventors: Aman Chauhan, San Jose, CA (US); Srinivasa Srikanth Podila, Bangalore (IN); Lakshmana Murthy Mantha, Pleasanton, CA (US); Vivek Kalyanaraman, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/391,466

(22) Filed: Dec. 20, 2023

(65) Prior Publication Data

US 2024/0214311 A1 Jun. 27, 2024

Related U.S. Application Data

(60) Provisional application No. 63/476,531, filed on Dec. 21, 2022.

(51) Int. Cl.
H04L 47/125 (2022.01)
H04L 45/24 (2022.01)

(52) U.S. Cl.
CPC ............ H04L 47/125 (2013.01); H04L 45/24 (2013.01)

(58) Field of Classification Search
CPC . H04L 41/0897; H04L 41/0895; H04L 45/24; H04L 47/125; H04L 45/02; G06F 2009/4557
See application file for complete search history.

(56) References Cited

U.S. PATENT DOCUMENTS

2018/0176289 A1* 6/2018 Watanabe ........... H04L 67/1008
2019/0104069 A1* 4/2019 Kommula ........... G06F 9/45558
2020/0004569 A1* 1/2020 Gupta ................... G06F 9/5072
2021/0029031 A1* 1/2021 Boutros ................. H04L 45/74

OTHER PUBLICATIONS

P. Bellini, D. Cenni and P. Nesi, "A Knowledge Base Driven Solution for Smart Cloud Management," 2015 IEEE 8th International Conference on Cloud Computing, New York, NY, USA, 2015, pp. 1069-1072. (Year: 2015).*
W. D. Qin and W. Shanshan, "Generation and Optimization of Elastic Extension Rules Based on Cloud Computing," 2016 International Conference on Intelligent Transportation, Big Data & Smart City (ICITBS), Changsha, China, 2016, pp. 98-100. (Year: 2016).*

* cited by examiner

*Primary Examiner* — Messeret F Gebre
(74) *Attorney, Agent, or Firm* — Kim & Stewart LLP

(57) ABSTRACT

An example method of performing a scaling operation for a distributed load balancer in a multi-cloud system includes: initiating, by a controller of the distributed load balancer, a scaling operation targeting a plurality of clouds in the multi-cloud system; determining, by the controller, implementations of the scaling operation for the plurality of clouds based on networking infrastructures of the plurality of clouds; and executing, by the controller, an implementation of the scaling operation for a first cloud of the plurality of clouds, the implementation including operations of: configuring a network interface on a data plane device of the distributed load balancer and configuring an upstream network of the first cloud.

20 Claims, 10 Drawing Sheets

ELASTIC SCALING OF SOFTWARE-DEFINED DISTRIBUTED LOAD BALANCERS ACROSS CLOUDS

CROSS-REFERENCE TO RELATED APPLICATIONS

This application claims priority to U.S. Provisional Patent Application Ser. No. 63/476,531, filed Dec. 21, 2022, which is incorporated by reference herein in its entirety.

BACKGROUND

In a software-defined data center (SDDC), virtual infrastructure, which includes virtual compute, storage, and networking resources, is provisioned from hardware infrastructure that includes a plurality of host computers, storage devices, and networking devices. The provisioning of the virtual infrastructure is carried out by management software that communicates with virtualization software (e.g., hypervisor) installed in the host computers. SDDC users move through various business cycles, requiring them to expand and contract SDDC resources to meet business needs. This leads users to employ multi-cloud solutions, such as typical hybrid cloud solutions where the SDDC spans across an on-premises data center and a public cloud.

SDDCs typically operate a great number of interconnected servers to implement certain network services. For example, load balancing services are often implemented to balance workload across different servers for applications. A software-defined distributed load balancer includes a multi-node control plane and a multi-node data plane. The control plane devices form a cluster known as a controller that functions as a single point of intelligence, management, and control for the distributed data plane. A data plane device is a load balancer device that provides traffic management and application security while collecting real-time analytics from the traffic flows. An application deployed with the distributed load balancer is exposed to the client network via a Virtual Internet Protocol address (VIP) and the traffic to the VIP is proxied to application servers by the data plane nodes.

Based on traffic load reaching the VIP of the application, the controller can scale the data plane nodes by adding capacity to improve application latency or reducing the capacity to conserve data center resources. This can be achieved by three operations, namely, scale out, scale in, and migrate operations. Scale out increases the capacity of an application by distributing the incoming traffic across one or more additional data plane devices. Scale in reduces the capacity of an application and conserves resources by withdrawing application state from one or more data plane devices. Migrate moves the application between data plane devices (i.e., vacated from one device and moved to another device) for various use-cases, such as improving the distribution of resources, providing non-disruptive maintenance windows, and providing for zero-downtime rolling upgrades.

In a multi-cloud system, however, clouds can provide different network infrastructures that affect how the scaling operations are performed. Scaling without proper orchestration of network programming on cloud and data plane devices can disrupt traffic flows for the application and affect application uptime.

SUMMARY

An exemplary method of performing a scaling operation for a distributed load balancer in a multi-cloud system is described herein. A controller of the distributed load balancer initiates a scaling operation targeting a plurality of clouds in the multi-cloud system and determines implementations of the scaling operation based on networking infrastructures of the plurality of clouds. The controller executes an implementation for a first cloud, wherein the implementation includes configuring a network interface on a data plane device of the distributed load balancer and configuring an upstream network of the first cloud.

In addition, a non-transitory computer-readable storage medium comprising instructions that cause a computer system to carry out the above method, as well as a computer system configured to carry out the above method are described.

DETAILED DESCRIPTION

Figure 1:
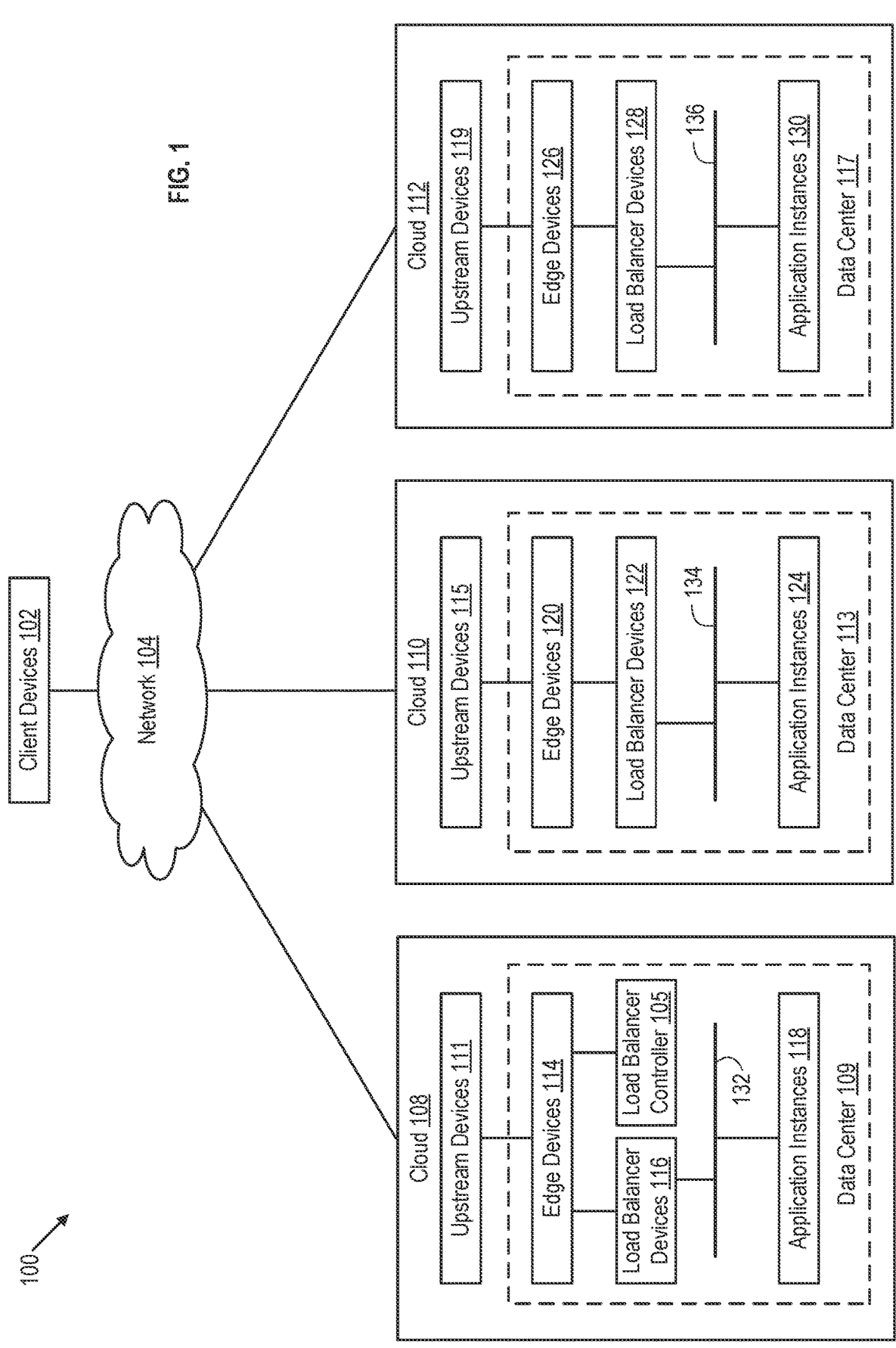
FIG. 1 is a block diagram depicting an exemplary multi-cloud system.

FIG. 1 is a block diagram depicting a multi-cloud system 100 according to an exemplary embodiment of the technology described herein. Multi-cloud system 100 includes client devices 102 that interact with a network application executing in a plurality of clouds including cloud 108, cloud 110, and cloud 112. The network application includes multiple instances executing across clouds 108, 110, and 112, which include application instances 118 executing in cloud 108, application instances 124 executing in cloud 110, and application instances 130 executing in cloud 112. One or more of clouds 108, 110, and 112 can be public clouds operated by one or more cloud computing service providers. One or more of clouds 108, 110, and 112 can be private clouds controlled and administered by a particular enterprise or business organization. Furthermore, each cloud 108, 110, 112 may be geographically distant from other clouds, although it is also possible for them to be collocated. An operator of a private cloud can also be a tenant of a public cloud (alongside a multitude of other tenants). Client devices 102 can be laptop computers, desktop computers, tablets, mobile devices, and/or any other type of computing device. Client devices 102 can include web browsers, special purpose applications, or the like that enable a user to access the network application executing across clouds 108, 110, and 112 via a network 104, which may be the public Internet. While three clouds 108, 110, and 112 are shown by example, multi-cloud system 100 can include two or more clouds. While one network application is described, multiple applications can include instances executing across the clouds.

Cloud 108 includes data center 109, cloud 110 includes data center 113, and cloud 112 includes data center 117. Each data center 109, 113, and 117 comprises a software-defined data center (SDDC) having edge devices, load balancer devices, logical networks, and application instances. Specifically, data center 109 includes edge devices 114, load balancer devices 116, logical network 132, and application instances 118. Data center 113 includes edge devices 120, load balancer devices 122, logical network 134, and application instances 124. Data center 117 includes edge devices 126, load balancer devices 128, logical network 136, and application instances 130. As used herein, a device refers to an entity with one or more network interfaces through which networking traffic (e.g., packets) is sent and received. A device can be implemented using hardware, software, or a combination thereof. A device can be a physical device (e.g., a physical server computer), a virtual device (e.g., a virtual machine), or a combination thereof. A network interface can be implemented as a physical port (e.g., an Ethernet port, a wireless interface, etc.), a virtual port (e.g., software emulation of a physical port), or a combination thereof.

In FIG. 1, data center 109 is coupled to network 104 through upstream devices 111, data center 113 is coupled to network 104 through upstream devices 115, and data center 117 is coupled to network 104 through upstream devices 119. In the embodiment, upstream devices 111, 115, and 119 are part of respective clouds 108, 110, and 112. However, in some embodiments, upstream devices to which a data center connects can be part of network 104. Examples of upstream devices include routers, bridges, switches, and the like. While the same upstream devices can forward packets from data centers to client devices 102, for purposes of discussion, networks in data centers are referred to as the ends of the network traffic streams from the client devices 102 and points on the network path before the packets reach data center networks are said to be upstream from those data center networks.

The network application of FIG. 1 is deployed behind a software-defined distributed load balancer (hereinafter "load balancer") that includes a load balancer controller and a load balancer data plane. In the example, a load balancer controller 105 is deployed in data center 109 of cloud 108. However, load balancer controller 105 can be deployed in any of the clouds or in multiple of the clouds, or in a cloud (not shown) other than one hosting an instance of the network application. The load balancer data plane is implemented by load balancer devices 116 in data center 109, load balancer devices 122 in data center 113, and load balancer devices 128 in data center 117. Load balancer devices 116 are connected to logical network 132 and balance traffic across application instances 118. Load balancer devices 122 are connected to logical network 134 and balance traffic across application instances 124. Load balancer devices 128 are connected to logical network 136 and balance traffic across application instances 130.

In data center 109, load balancer devices 116 and load balancer controller 105 are connected to upstream devices 111 through edge devices 114 of data center 109. Edge devices 109 provide an edge of the data center 109, e.g., can execute an edge services gateway or the like. Data center 113 likewise includes edge devices 120 between upstream devices 115 and load balancer devices 122, and data center 117 likewise includes edge devices 126 between upstream devices 119 and load balancer devices 128.

The network application is deployed behind the load balancer and exposed to the client devices 102 by one or more virtual IP addresses (VIPs). Traffic to a VIP is proxied to application instances by the load balancer devices. Based on the load of traffic reaching a VIP of the network application, load balancer controller 105 can scale the load balancer data plane, i.e., add capacity to improve application latency or reduce capacity to conserve data center resources. Load balancer controller 105 can execute three scaling operations, including scale out, scale in, and migrate operations. The interface for scale out, scale in, and migrate is unified across all the clouds of multi-cloud system 100. As noted above, different clouds can provide different networking infrastructures so that adding or removing load balancer devices to handle scale requirements can be a different process for each cloud. Generally, programming an application on a load balancer device requires two steps: 1) configuring the network on the load balancer device for data-path connectivity; and 2) configuring the network on the cloud to manage routes on the upstream network device, open ports, and configure security roles. Scaling without proper orchestration of network programming on cloud and data plane devices can disrupt traffic flows for the application and affect its uptime for the clients. The techniques described herein for scaling operations include synchronized programming of the cloud network and the data plane devices across multiple clouds under the same semantics of scale out, scale in, and migrate. This provides a guarantee that scale requirements will be fulfilled irrespective of the cloud with little to no downtime for the application during activities such as auto-scaling, maintenance, and upgrades.

Figure 2:
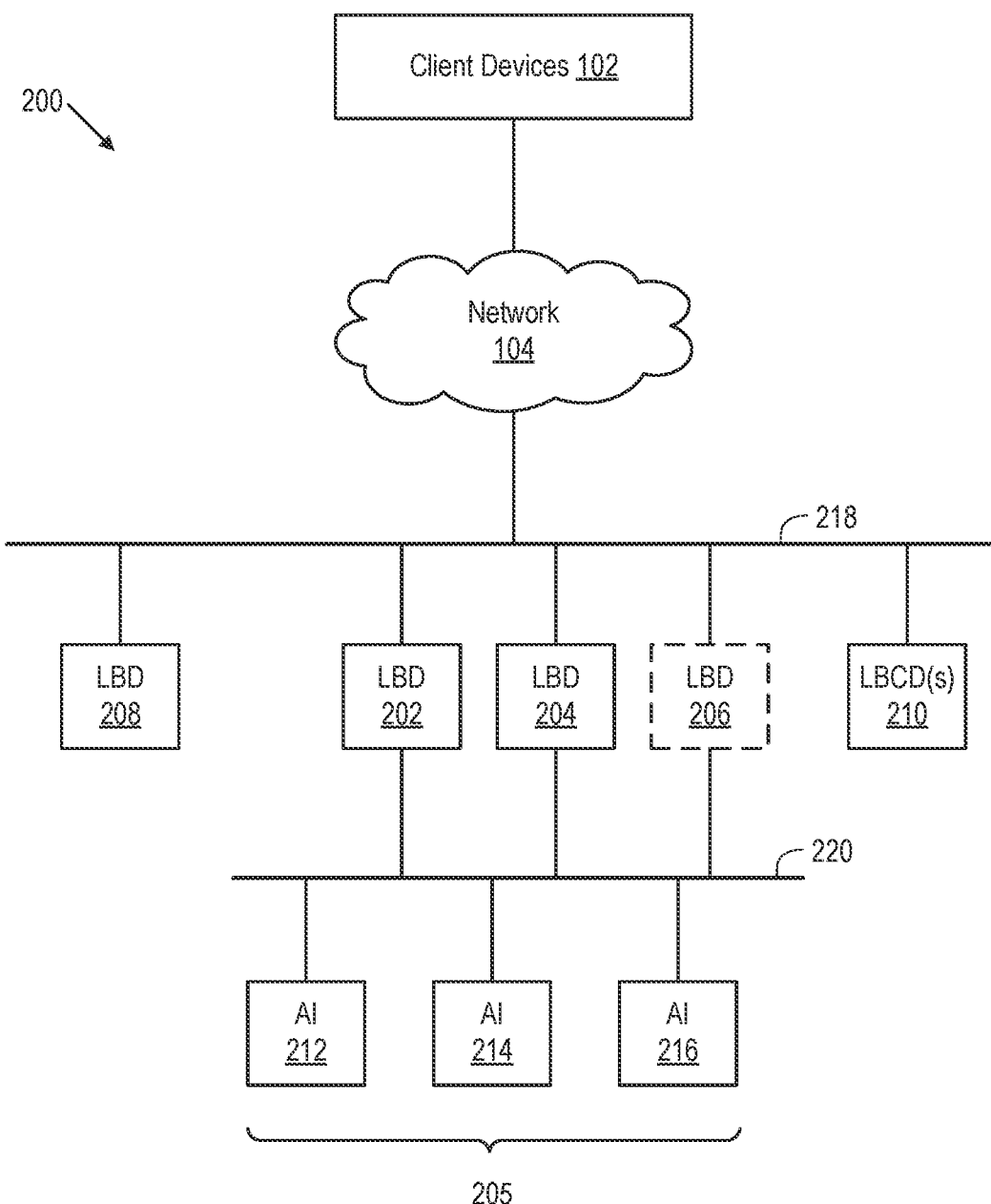
FIG. 2 is a block diagram depicting an exemplary distributed load balancing platform.

FIG. 2 is a block diagram depicting an exemplary distributed load balancing platform 200. Distributed load balancing platform 200 includes client devices 102, network 104, a plurality of load balancing devices (LBDs) 202, 204, 206, 208, one or more load balancer controller devices (LBCDs) 210, and application instances (AIs) 212, 214, and 216. LBDs 202, 204, 206, and 208, as well as LBCDs 210, are coupled to network 104 through a network 218. Network 218 can be referred to as a client network. AIs 212, 214, and 216 are coupled to a logical network 220. Network 220 can also be referred to as a server network. LBDs 202, 204, 206, and 208 are likewise coupled to logical network 220. The LBDs, LBCDs, AIs, and networks 218 and 220 can be part of a data center in a cloud (e.g., any one of data centers 109, 113, and 117 shown in FIG. 1). That is, each data center 109, 113, and 117 of FIG. 1 can have a client network 218, server network 220, a set of LBDs connected to the client and server networks, and AIs such as that illustrated in FIG. 2.

An application 205 includes AIs 212, 214, and 216 and is deployed behind the load balancer implemented using LBDs and LBCDs. Application 205 is defined by its VIP, network 218 where the VIP is advertised, a set of ports through which the traffic is accepted, and a collection of instances to which the traffic is load balanced. When application 205 is scaled out, its VIP is configured on multiple data plane devices (e.g., LBDs 202, 204, 206, 208). These data plane devices are also configured for connection to network 218 and logical network 220. Any traffic destined for the VIP and port of application 205 will be distributed across all data plane devices hosting the VIP.

In the example of FIG. 2, LBDs 202 and 204 provide load balancing for AIs 212, 214, and 216 at all times. At different times, LBD 206 can be added to the data plane in a scale out operation, removed from the data plane in a scale in operation, or migrated to another LBD, such as LBD 208 (where migration includes moving application state from one device to another device). LBCD 210 allows a user to manually initiate scaling operations to address the scale requirements of application 205. LBCD 210 also allows the user to configure rules for auto-scaling based on particular metrics. As noted above, scale in and scale out operations include two stages: 1) programming network 118 on the cloud (referred to as "cloud programming"); and 2) programming the data-path of a data plane device (LBDs) (referred to as DP programming). Depending on the cloud and its network infrastructure, LBCD 210 orchestrates which actions should be taken and in which order the actions should be taken. Examples are described below for clouds that allow address resolution protocol (ARP) control for DP programming, clouds that only support IP-based routing on upstream routers for cloud programming, and clouds that only support equal cost multipath (ECMP)-based routing on upstream routers for cloud programming.

Figure 3:
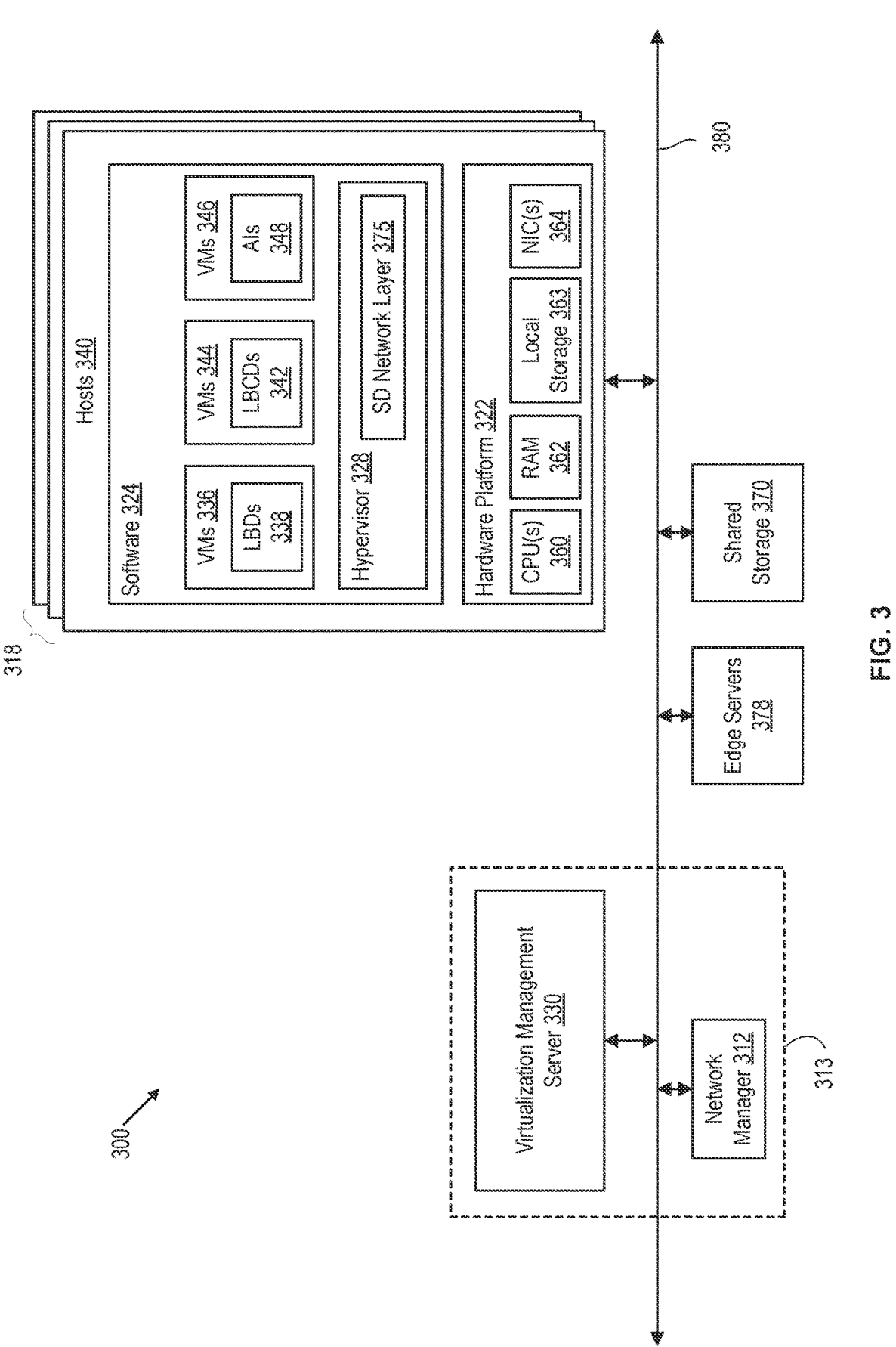
FIG. 3 is a block diagram of an exemplary SDDC.

FIG. 3 is a block diagram of an SDDC 300, and each data center 109, 113, and 117 of FIG. 1 may be implemented as SDDC 300 is described herein. SDDC 300 includes a cluster of hosts 340 ("host cluster 318") that may be constructed on hardware platforms such as an x86 architecture platforms. For purposes of clarity, only one host cluster 318 is shown. However, SDDC 300 can include many of such host clusters 318. As shown, a hardware platform 322 of each host 340 includes conventional components of a computing device, such as one or more central processing units (CPUs) 360, system memory (RAM) 362, one or more network interface controllers (NICs) 364, and optionally local storage 363. CPUs 360 are configured to execute instructions, for example, executable instructions that perform one or more operations described herein, which may be stored in RAM 362. NICs 364 enable host 340 to communicate with other devices through a physical network 380. Physical network 380 enables communication between hosts 340 and between other components and hosts 340 (other components discussed further herein).

In FIG. 3, hosts 340 may access shared storage 370 by using NICs 364 to connect to network 380. In another embodiment, each host 340 contains a host bus adapter (HBA) through which input/output operations (IOs) are sent to shared storage 370 over a separate network. Shared storage 370 include one or more storage arrays, such as a storage area network (SAN), network attached storage (NAS), or the like. Hosts 340 may include local storage 363 (e.g., hard disk drives, solid-state drives, etc.). Local storage 363 in each host 340 can be aggregated and provisioned as part of a virtual SAN, which is another form of shared storage 370.

Software 324 of each host 340 provides a virtualization layer, referred to herein as a hypervisor 328, which abstracts processor, memory, storage, and network resources of hardware platform 322 to provide a virtual machine execution space within which multiple virtual machines (VM) 336, 344, 346 may be concurrently instantiated and executed and provide isolated execution spaces on a single physical host within which separate operating systems and application software can execute. For example, VMs 336 can execute LBDs 338 of a load balancer, VMs 344 can execute LBCDs 342 of the load balancer, and VMs 346 can execute AIs 348 of an application.

Host cluster 318 is configured with a software-defined network (SDN) layer 375 at least partially implemented by hypervisors 328. SDN layer 375 includes logical network services executing on virtualized infrastructure in host cluster 318. The virtualized infrastructure that supports the logical network services includes hypervisor-based components, such as resource pools, virtual switches, etc., as well as VM-based components, such as router control VMs, load balancer VMs, edge servers, etc. Logical network services include logical switches and logical routers, as well as logical firewalls, logical load balancers, and the like, implemented on top of the virtualized infrastructure. SDDC 300 may include edge servers 378 that provide an interface of host cluster 318 to a wide area network (WAN) (e.g., a corporate network, the public Internet, etc.). Edge servers 378 can be physical servers or VMs.

Virtualization management server 330 is a physical or virtual server that manages host cluster 318 and the virtualization layer therein. Virtualization management server 330 installs agent(s) in hypervisor 328 to add a host 340 as a managed entity. Virtualization management server 330 logically groups hosts 340 into host cluster 318 to provide cluster-level functions to hosts 340. The number of hosts 340 in host cluster 318 may be one or many. Virtualization management server 330 can manage more than one host cluster 318.

In an embodiment, SDDC 300 further includes a network manager 312. Network manager 312 is a physical or virtual server that orchestrates SDN layer 375. In an embodiment, network manager 312 comprises one or more virtual servers deployed as VMs. Network manager 312 installs additional agents in hypervisor 328 to add a host 340 as a managed entity, referred to as a transport node. In this manner, host cluster 318 can be a cluster of transport nodes.

Figure 4:
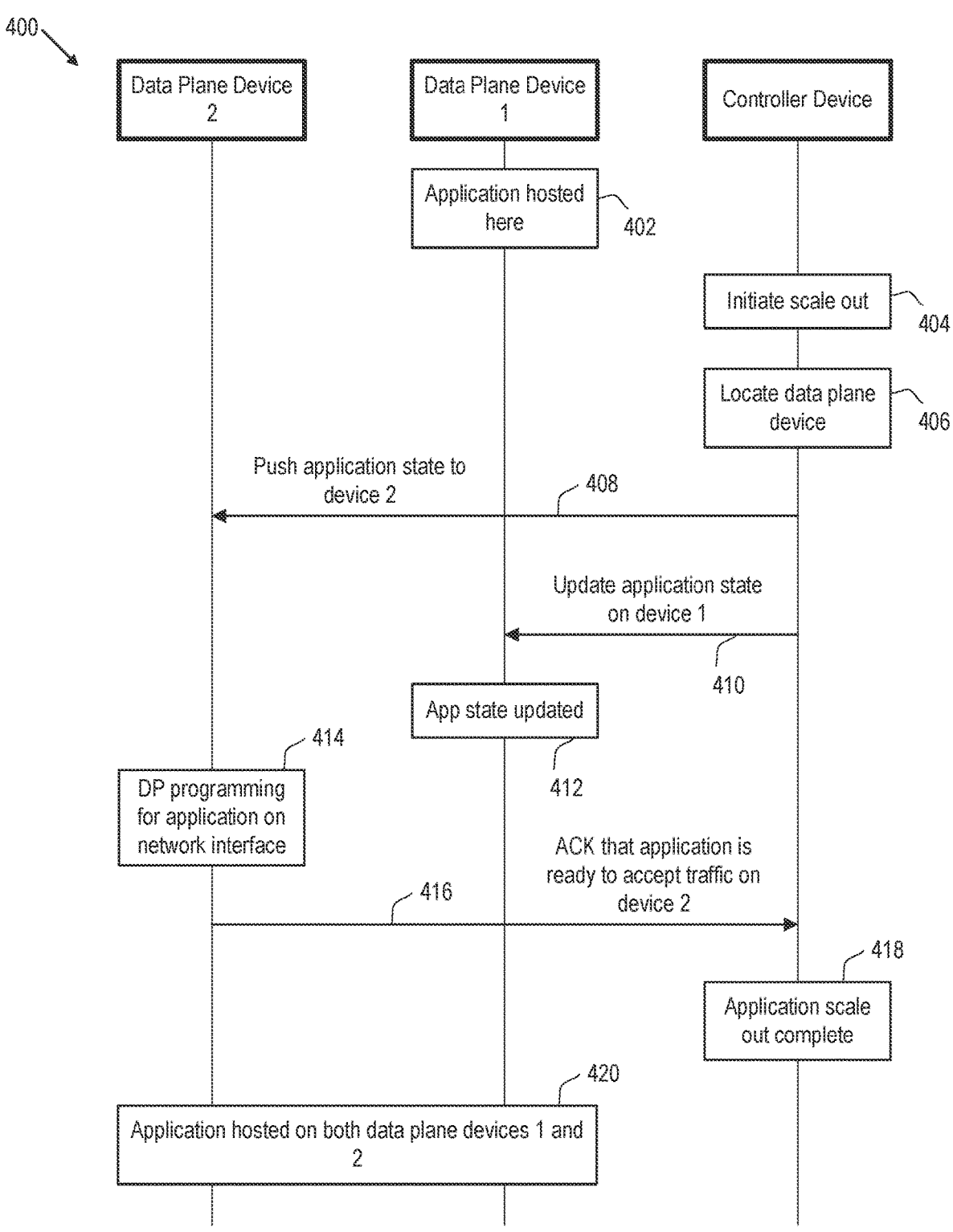
FIG. 4 is a flow diagram depicting an exemplary method of scale out in a distributed load balancing platform.

FIG. 4 is a flow diagram depicting an exemplary method 400 of scale out in a distributed load balancing platform. The distributed load balancing platform supports ARP control for data plane programming. Method 400 describes operations for a controller device (e.g., LBCD), data plane device 1 (an LBD), and data plane device 2 (another LBD).

Some public clouds allow ARP control through the network interfaces of the data plane. The data plane distributes the traffic across its devices over Layer 2 of the Open Systems Interconnection (OSI) stack with the help of a flow table that is maintained on each device. When an application is scaled out, its VIP is configured on multiple data plane devices with one device designated as the primary device. These data plane devices are also configured to be connected to the client and server networks. The primary device receives all the incoming traffic for the VIP of the application through a client network interface. The primary device then distributes this traffic load on to other data plane devices configured with the VIP over Layer 2 using a flow table. In particular, any traffic destined for the VIP of the application will be distributed across all the data plane devices hosting the VIP with the help of a flow table maintained on each device. The flow table includes the list of data plane devices and the associated network interfaces on which the application is hosted on each device. The application VIP, list of ports, list of client and server network interfaces, the flow table, and a set of runtime flags together comprise an "application state" on each data plane device.

Method 400 begins at step 402, where the application is hosted by data plane device 1. At step 404, the controller device initiates a scale out operation. At step 406, the controller device locates a data plane device for the scale out operation. The controller finds data plane device 2 with access to both client and server networks. The controller keeps track of all networks that are accessible from each device in the data plane. Once the controller receives a scale-out request, the controller evaluates the networks that are required to provide connectivity to the clients and the servers for the application. The controller then finds and selects the data plane device that is connected to the networks that match the client and server networks for the application. At step 408, the controller device pushes the application state to data plane device 2. At step 410, the controller device updates the application state on data plane device 1 to account for the addition of data plane device 2 to the data plane. At step 412, the application state at data plane device 1 is updated. At step 414, the data plane device 2 executes DP programming for the application on its network interface. DP programming includes configuring the data plane device 2 to actively listen on the network interface connected to the client network for traffic belonging to the VIP of the application. This includes updating and maintaining the configuration of that particular network interface. At step 416, the data plane device 2 sends an acknowledgement to the controller device that the application is ready to accept traffic on data plane device 2. At step 418, the controller device indicates that application scale out is complete. At step 420, the application is hosted on both data plane nodes 1 and 2.

Figure 5:
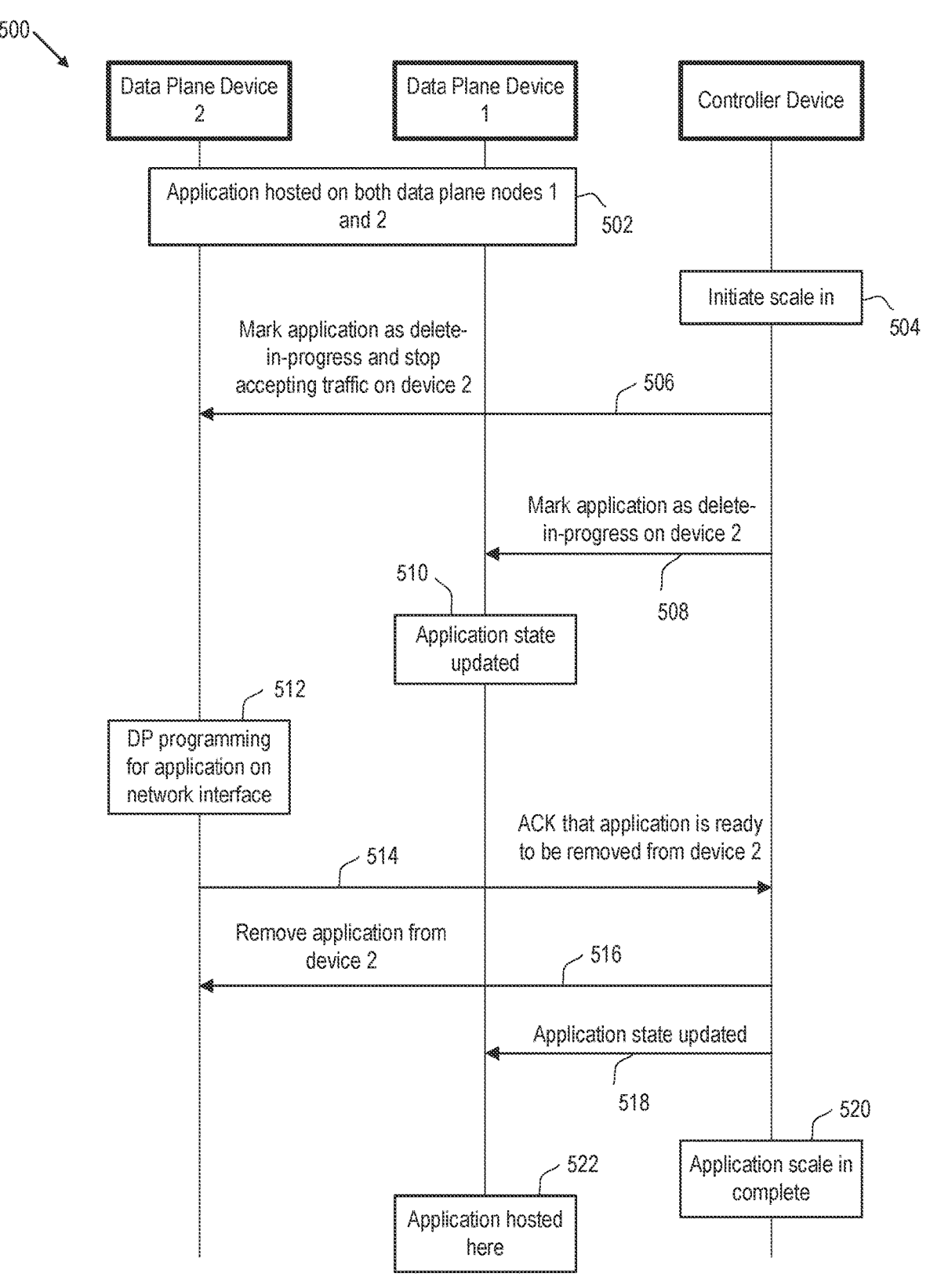
FIG. 5 is a flow diagram depicting an exemplary method of scale-in in a distributed load balancing platform.

FIG. 5 is a flow diagram depicting a method 500 of scale-in in a distributed load balancing platform. In the embodiment, the distributed load balancing platform supports ARP control for both cloud programming and data plane programming. Method 500 describes operations for a controller device (e.g., LBCD), data plane device 1 (an LBD), and data plane device 2 (another LBD).

Method 500 begins at step 502, where the application is hosted by both data plane devices 1 and 2. At step 504, the controller device initiates the scale in operation. At step 506, the controller device communicates with the data plane device 2 and marks the application as delete-in-progress. The controller device instructs the data plane device 2 to stop accepting traffic. At step 508, the controller device communicates with the data plane device 1 and marks the application as delete-in-progress on data plane device 2. This prevents data plane device 1 from forwarding traffic to data plane device 2. At step 510, the data plane device 1 updates the application state (only data plane device 1 is present for load balancing and is primary). At step 512, data plane device 2 performs DP programming for the application on its network interface. The DP programming includes configuring the data plane device 2 to stop listening for traffic belonging to the VIP of the application on the client network interface. The data plane device 2 then clears the application state therefrom. At step 514, the data plane device 2 acknowledges to the controller device that the application is ready to be removed from the data plane device 2. At step 516, the controller device instructs the data plane device 2 to remove the application state. At step 518, the controller updates the application state on data plane device 1 to account for removal of device 2 from the data plane. At step 520, the controller device indicates that the application scale in operation is complete. At step 522, the application is hosted only on data plane device 1.

Figure 6:
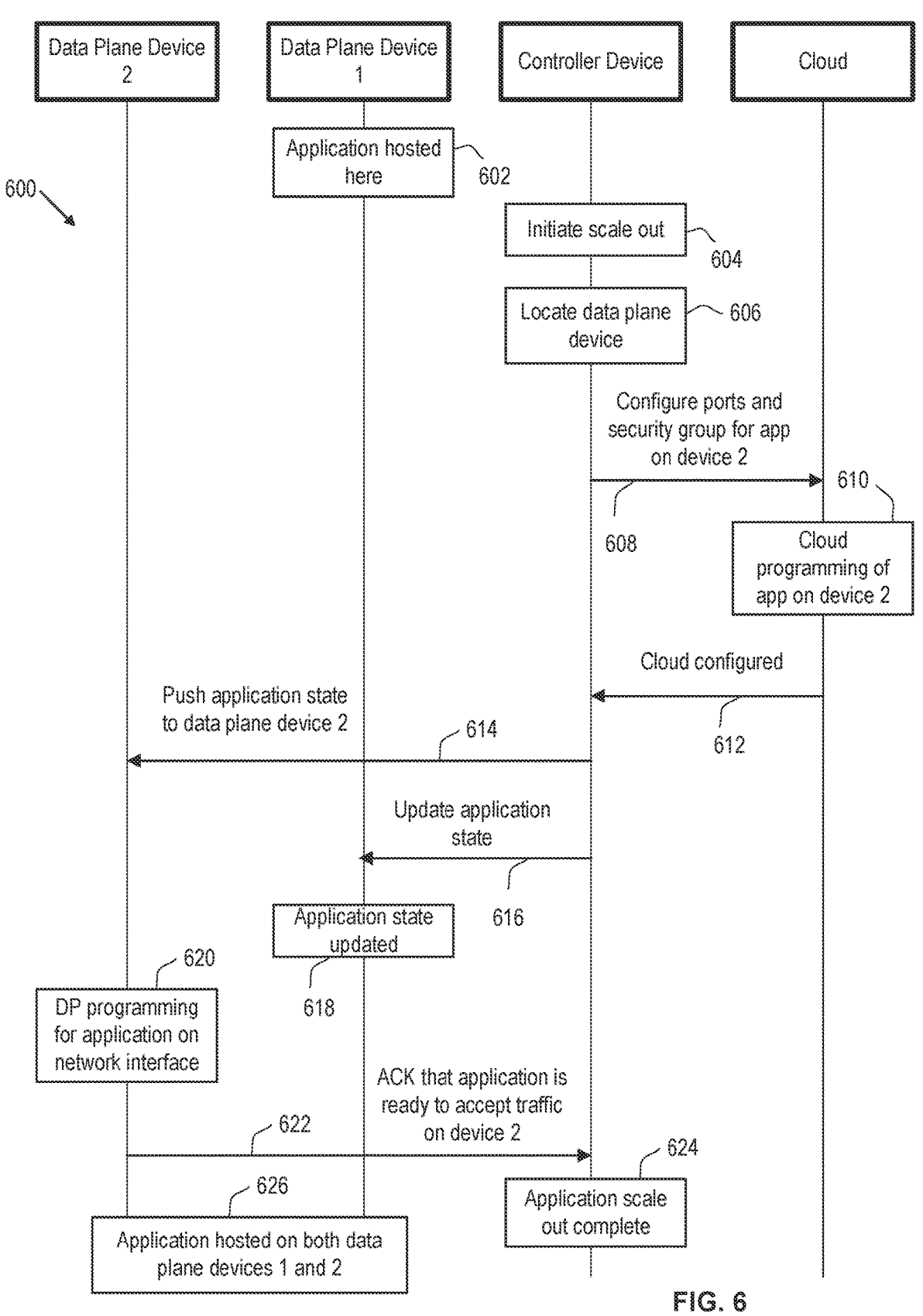
FIG. 6 is a flow diagram depicting an exemplary method of scale out in a distributed load balancing platform.

FIG. 6 is a flow diagram depicting a method 600 of scale out in a distributed load balancing platform. Some public clouds, for example, only support IP-based routing on the upstream router. In such cases, the controller configures a route on the cloud to the primary data plane device hosting the application's VIP. This data plane device then distributes the traffic with other data plane devices in the data plane hosting the VIP over Layer 2 of the OSI stack. Method 600 describes operations for a controller device (e.g., LBCD), data plane device 1 (an LBD), data plane device 2 (another LBD), and cloud (e.g., upstream devices).

Method 600 begins at step 602, where the application is hosted by data plane device 1. At step 604, the controller device initiates a scale out operation. At step 606, the controller device locates a data plane device for the scale out operation. The controller finds data plane device 2 with access to both client and server networks. The controller keeps track of all networks that are accessible from each device in the data plane. Once the controller receives a scale-out request, the controller evaluates the networks that are required to provide connectivity to the clients and the servers for the application. The controller then finds and selects the data plane device that is connected to the networks that match the client and server networks for the application. At step 608, the controller device communicates with the cloud (upstream devices) to configure for the cloud to allow the application to be hosted on data plane device 2. At step 610, the cloud performs programming of the application to allow hosting on data plane device 2. The cloud configures a route to the primary data plane device (if not present already), opens ports for the application, and configures security groups for the application. At step 612, the cloud has been configured. At step 614, the controller device pushes the application state to the data plane device 2. At step 616, the controller device updates the application state on data plane device 1 to account for addition of data plane device 2 to the data plane. At step 618, the application state on data plane device 1 is up-to-date. At step 620, the data plane device 2 performs DP programming for the application on the network interface. DP programming includes configuring the data plane device 2 to actively listen on the network interface connected to the client network for traffic belonging to the VIP of the application. This includes updating and maintaining the configuration of that particular network interface. At step 622, the data plane device 2 acknowledges to the controller device that the application is ready to accept traffic on the data plane device 2. At step 624, the control device indicates that the application scale out is complete. At step 626, the application is hosted on both the data plane devices 1 and 2.

Figure 7:
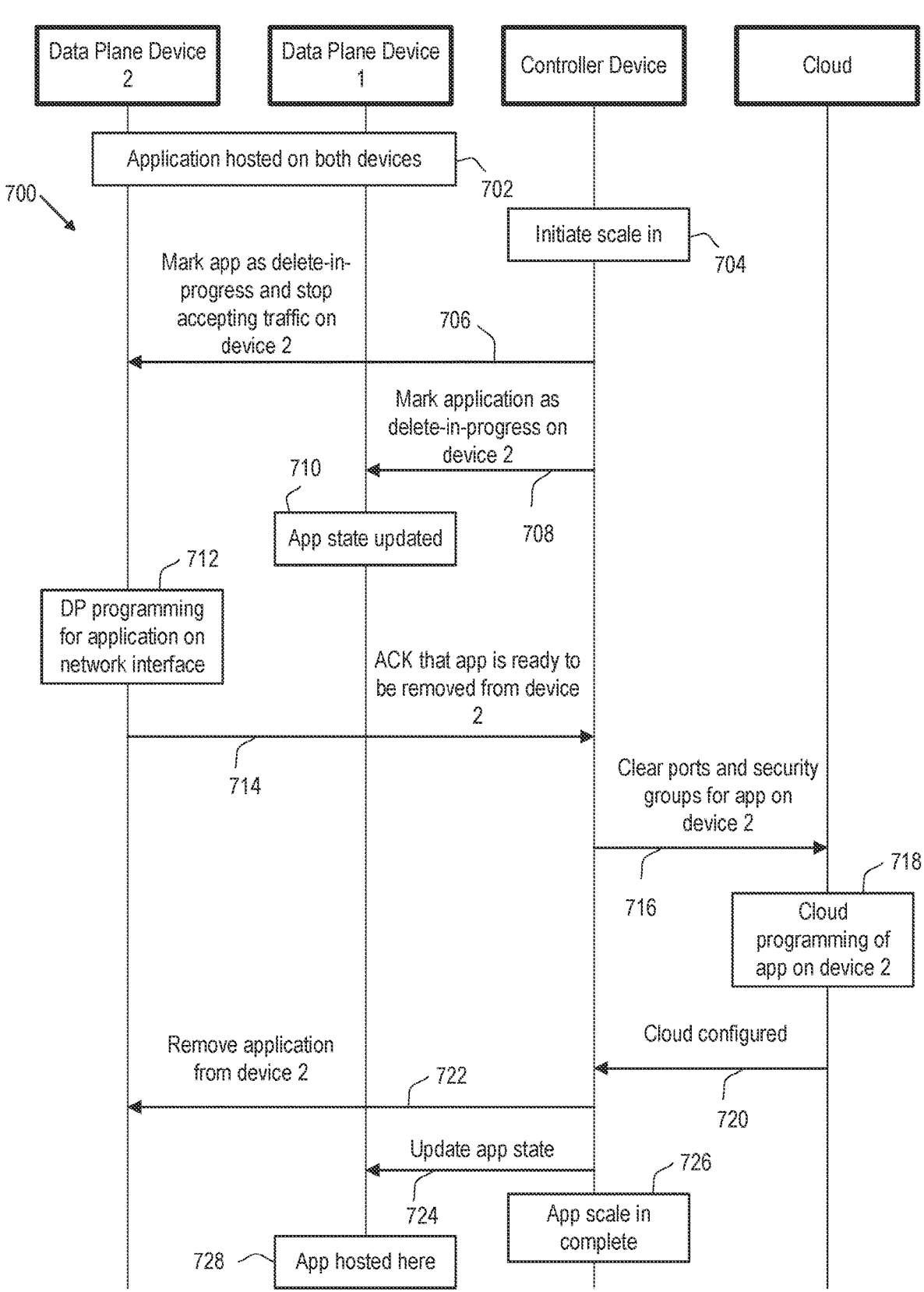
FIG. 7 is a flow diagram depicting an exemplary method of scale-in in a distributed load balancing platform.

FIG. 7 is a flow diagram depicting a method 700 of scale-in in a distributed load balancing platform. In the embodiment, the cloud only supports IP-based routing on the upstream router for cloud programming.

Method 700 begins at step 702, where the application is being hosted by both data plane devices 1 and 2. At step 704, the controller device initiates the scale in operation. At step 706, the controller device instructs the data plane device 2 to mark the application as delete-in-progress and to stop accepting traffic. At step 708, the controller device instructs the data plane device 1 to mark the application as delete-in-progress on data plane device 2. Data plane device 1 will no longer forward traffic to any device that is delete-in-progress. At step 710, data plane device 2 updates the application state (e.g., load balancing being performed by only data plane device 1). At step 712, the data plane device 2 performs DP programming for the application on its network interface. The DP programming includes configuring the data plane device 2 to stop listening for traffic belonging to the VIP of the application on the client network interface. The data plane device 2 then clears the application state therefrom. At step 714, the data plane device 2 acknowledges to the controller device that it is ready to remove the application's state. At step 716, the controller device communicates with the cloud (e.g., upstream devices) to clear ports and security groups for the application with respect to the data plane device 2. At step 718, the cloud performs cloud programming with respect to the application hosted by data plane device 2. The application ports are removed from the cloud (upstream device) and the application is removed from the security group. At step 720, the cloud is configured and traffic will no longer be able to reach data plane device 2 for the application. At step 722, the controller device instructs the data plane device 2 to remove the application state. At step 724, the controller device updates the application state on data plane device 1. At step 726, the controller device indicates application scale in operation is complete. At step 728, the application is hosted by only the data plane device 1.

Figure 8:
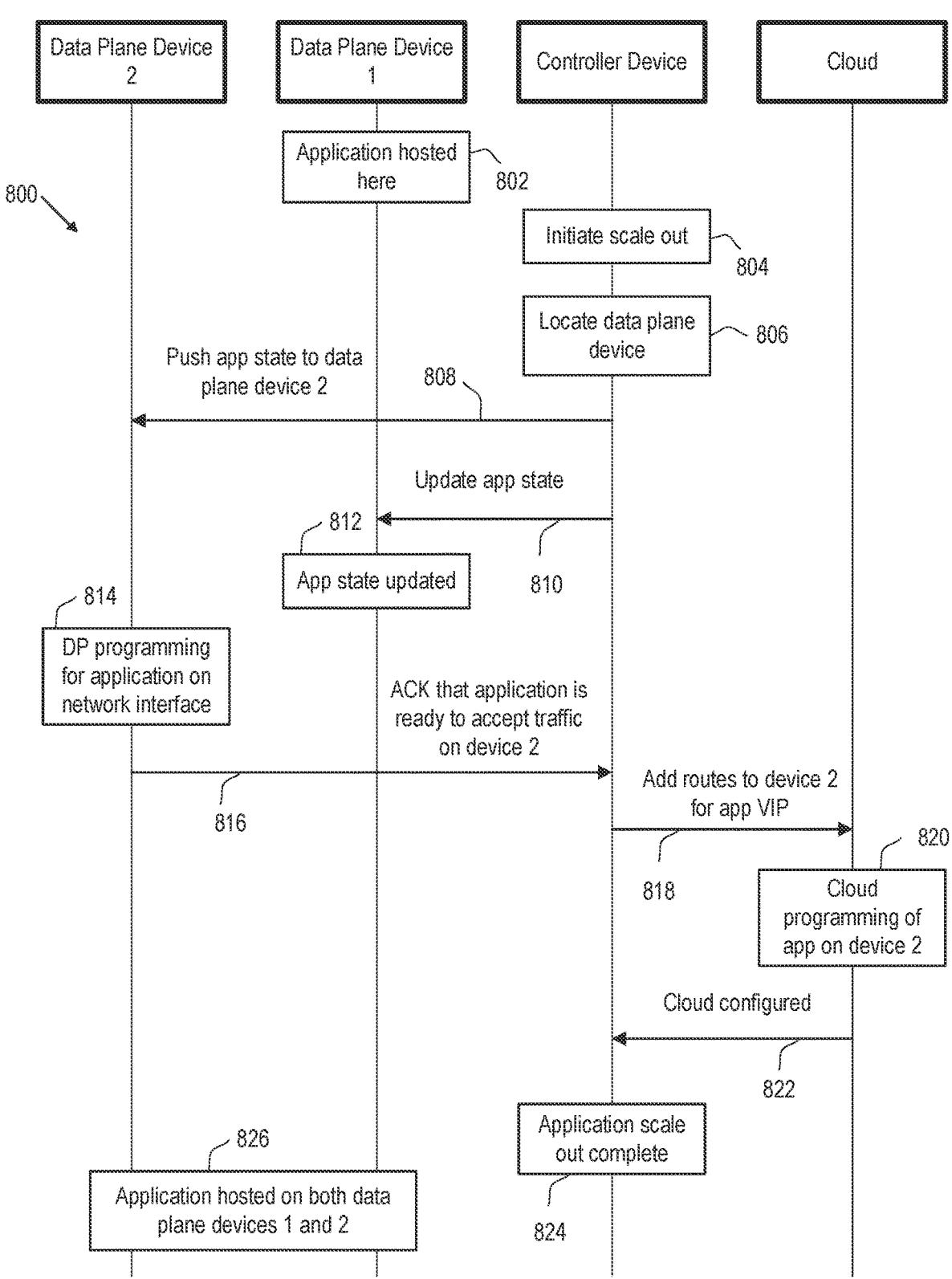
FIG. 8 is a flow diagram depicting an exemplary method of scale out in a distributed load balancing platform.

FIG. 8 is a flow diagram depicting a method 800 of scale out in a distributed load balancing platform. Some public clouds, for example, only support ECMP-based routing on the upstream devices. In such cases, the controller configures routes on the cloud to all the data plane devices hosting the virtual IP of the application. Each route has equal cost and the traffic is equally distributed across the data plane devices. The data plane devices do not distribute the traffic over Layer 2 of the OSI stack, since the distribution has already been performed by the upstream devices at Layer 3 of the OS stack. Method 800 describes operations for a controller device (e.g., LBCD), data plane device 1 (an LBD), data plane device 2 (another LBD), and cloud (e.g., upstream devices).

Method 800 begins at step 802, wherein the application is hosted on data plane device 1. At step 804, the controller device initiates a scale out operation. At step 806, the controller device locates a data plane device to be added to the data plane. The controller finds data plane device 2 with access to both client and server networks. The controller keeps track of all networks that are accessible from each device in the data plane. Once the controller receives a scale-out request, the controller evaluates the networks that are required to provide connectivity to the clients and the servers for the application. The controller then finds and selects the data plane device that is connected to the networks that match the client and server networks for the application. At step 808, the controller device pushes application state to data plane device 2. At step 810, the controller device updates the application state on data plane device 1 to account for addition of data plane device 2 to the data plane. At step 812, the application state at data plane device 1 has been updated. At step 814, the data plane device 2 performs DP programming for the application on its network interface. DP programming includes configuring the data plane device 2 to actively listen on the network interface connected to the client network for traffic belonging to the VIP of the application. This includes updating and maintaining the configuration of that particular network interface. At step 816, the data plane device 2 acknowledges to the controller device that the application is ready to accept traffic. At step 818, the controller device communicates with the cloud (upstream devices) to add routes to the data plane device 2 for the application VIP. At step 820, the cloud performs programming for the application to route traffic for the VIP to data plane device 2 based on ECMP routing. At step 822, the cloud configuration is complete. At step 824, the controller device indicates that the application scale out is complete. At step 826, the application is hosted on both the data plane devices 1 and 2.

Figure 9:
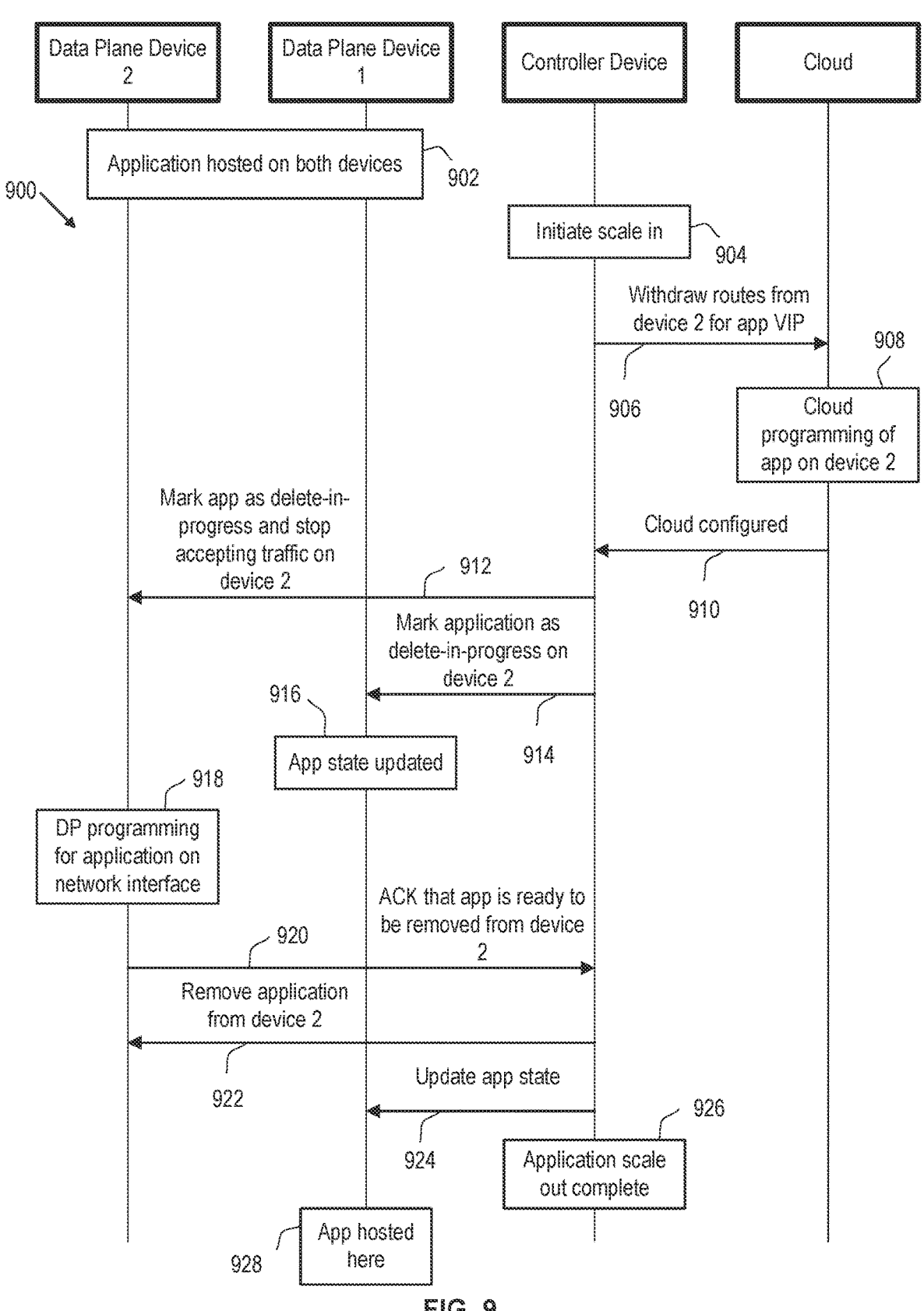
FIG. 9 is a flow diagram depicting an exemplary method of scale-in in a distributed load balancing platform.

FIG. 9 is a flow diagram depicting a method 900 of scale-in in a distributed load balancing platform. In the embodiment, the cloud only supports ECMP-based routing on the upstream devices.

Method 900 begins at step 902, the application is hosted on both devices 1 and 2. At step 904, the controller device initiates the scale in operation. At step 906, the controller device communicates with the cloud to withdraw routes to data plane device 2 for the application VIP. At step 908, the cloud performs programming (upstream devices) to remove the routes. At step 910, the cloud is configured. At step 912, the controller device instructs the data plane device 2 to mark the application as delete-in-progress and to stop accepting traffic. At step 914, the controller device instructs the data plane device 1 to mark the application as delete-in-progress. At step 916, the application state is updated at data plane device one (load balancing being performed by only data plane device 1). At step 918, the data plane device 2 performs DP programming for the application on its network interface. The DP programming includes configuring the data plane device 2 to stop listening for traffic belonging to the VIP of the application on the client network interface. The data plane device 2 then clears the application state therefrom. At step 920, the data plane device 2 acknowledges that the application is ready to be removed from data plane device 2. At step 922, the controller devices instructs the data plane device 2 to remove the application state. At step 924, the controller device updates the application state at data plane device 1 to account for removal of data plane device 2 from the data plane. At step 926, the controller device indicates that the application scale in operation is complete. At step 928, the application is hosted only on data plane device 1.

Figure 10:
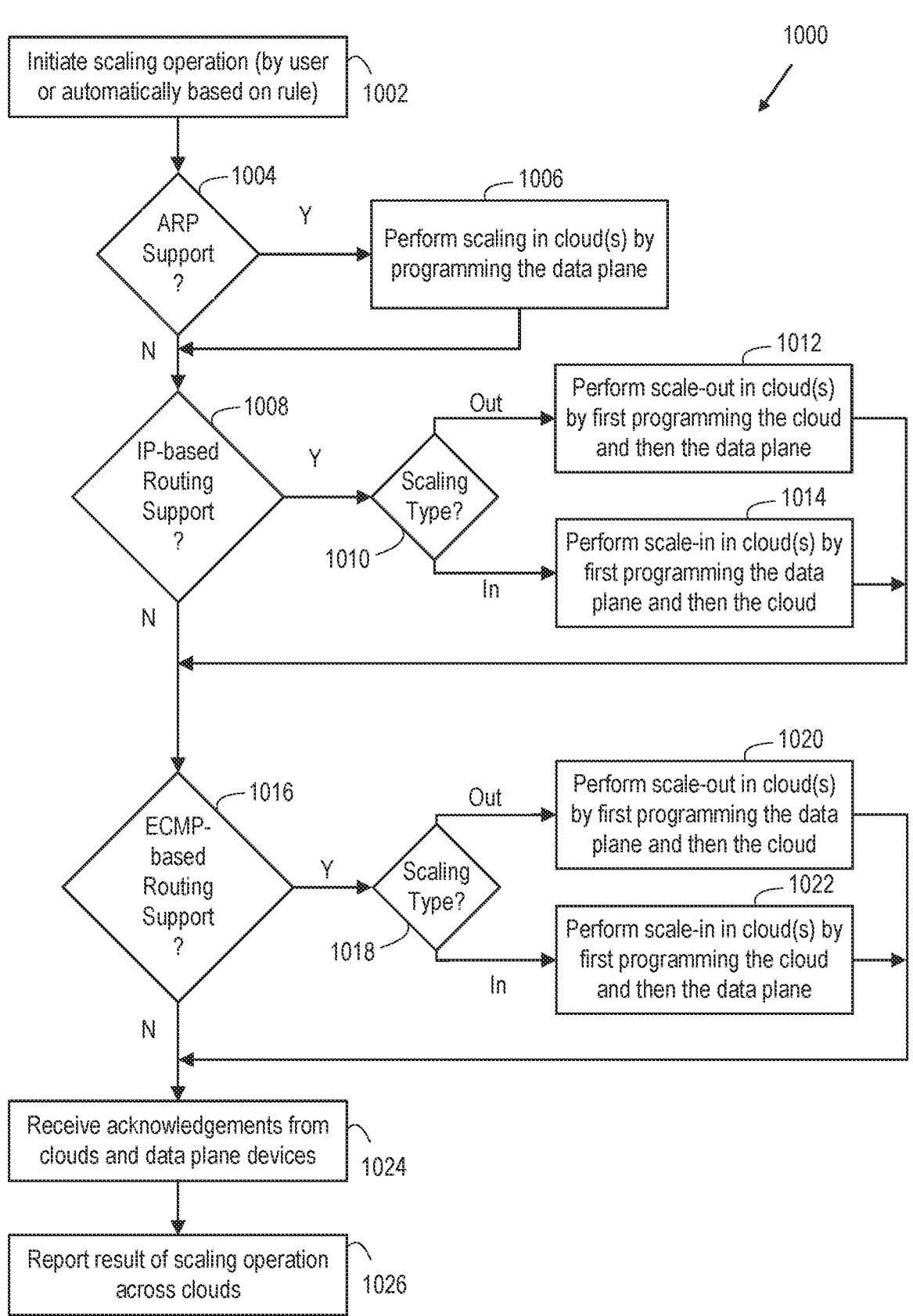
FIG. 10 is a flow diagram depicting an exemplary method of performing scaling operations in a distributed load balancing platform executing in a multi-cloud system.

FIG. 10 is a flow diagram depicting a method 1000 of performing scaling operations in a distributed load balancing platform executing in a multi-cloud system. Method 1000 begins at step 1002, where the load balancer controller initiates a scaling operation. The scaling operation can be initiated manually by a user or automatically by the controller based on rules setup by the user. At step 1004, the controller determines if any of the clouds in which the scaling operation is to be performed have ARP support. If so, method 1000 proceeds to step 1006 where the controller performs scaling in those cloud(s) by programming the data plane. Methods for scale out and scale in for such clouds are described above in FIGS. 4 and 5 respectively.

At step 1008, the controller determines if any of the clouds in which the scaling operation is to be performed support only IP-based routing for cloud updates. If so, method 1000 proceeds to step 1010. At step 1010, the controller determines the type of scaling operation. If scale out, method 1000 proceeds to step 1012, where the controller performs scale out in those cloud(s) by first programming cloud and then the data plane. If scale in, method 100 proceeds to step 1014, where the controller performs scale-in in those clouds by first programming the data plane and then programming the cloud. Methods for scale out and scale in for such clouds are described above in FIGS. 6 and 7.

At step 1016, the controller determines if any of the clouds in which the scaling operation is to be performed support only ECMP-based routing for cloud updates. If so, method 1000 proceeds to step 1018. At step 1018, the controller determines the type of scaling operation. If scale out, method 1000 proceeds to step 1020, where the controller performs scale out in those cloud(s) by first programming the data plane and then programming the cloud. If scale in, method 1000 proceeds to step 1022, where the controller performs scale-in in those cloud(s) by first programming the cloud and then programming the data plane. Methods for scale out and scale in for such clouds are described above in FIGS. 8 and 9.

At step 1024, the controller receives acknowledgements from each cloud and the respective data plane devices in which a scaling operation is performed. At step 1026, the controller reports the result of the scaling operation across the clouds and data plane devices to the user.

A device or an apparatus may perform these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The technology described herein may be practiced with other computer system configurations including hand-held devices, microprocessor systems, microprocessor-based or programmable consumer electronics, minicomputers, mainframe computers, etc.

Methods described above may be implemented using one or more computer programs or one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

It should be understood that certain changes may be made to the methods or systems described hereinabove without departing from the scope of the claims. Accordingly, the described technology is to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of performing a scaling operation for a distributed load balancer in a multi-cloud system, comprising:
   initiating, by a controller of the distributed load balancer, a scaling operation targeting a plurality of clouds in the multi-cloud system, the distributed load balancer configured to balance network traffic received at a virtual address across a plurality of instances of an application;
   determining, by the controller, implementations of the scaling operation for the plurality of clouds based on support of at least one of address resolution protocol, internet protocol (IP)-based routing, and equal cost multipath (ECMP) routing in the plurality of clouds; and
   executing, by the controller, an implementation of the scaling operation for a first cloud of the plurality of clouds corresponding to one of address resolution protocol, IP-based routing, or ECMP routing that is supported by the first cloud, the implementation including operations of: configuring a network interface on a data plane device of the distributed load balancer and configuring an upstream network of the first cloud.

2. The method of claim 1, further comprising determining an order of the operations of the scaling operation based on a networking infrastructure of the first cloud.

3. The method of claim 2, wherein the controller first configures the upstream network of the first cloud and then configures the network interface of the data plane device.

4. The method of claim 3, wherein the first cloud supports only internet protocol (IP)-based routing on a router of the upstream network, and wherein configuring the upstream network comprises configuring a route in the router to the data plane device.

5. The method of claim 2, wherein the controller first configures the network interface of the data plane device and then configures the upstream network of the first cloud.

6. The method of claim 5, wherein the first cloud supports only equal cost multipath (ECMP) routing on a router of the upstream network, and wherein configuring the upstream network comprises adding, to the router, a route to the data plane device to a set of routes having equal cost.

7. The method of claim 1, further comprising:
   executing, by the controller, an implementation of the scaling operation for a second cloud of the plurality of clouds, the implementation including only an operation of configuring a network interface on a data plane device of the distributed load balancer.

8. A non-transitory computer readable medium comprising instructions to be executed in a computing device to cause the computing device to carry out a method of performing a scaling operation for a distributed load balancer in a multi-cloud system, comprising:
   initiating, by a controller of the distributed load balancer, a scaling operation targeting a plurality of clouds in the multi-cloud system, the distributed load balancer configured to balance network traffic received at a virtual address across a plurality of instances of an application;
   determining, by the controller, implementations of the scaling operation for the plurality of clouds based on support of at least one of address resolution protocol, internet protocol (IP)-based routing, and equal cost multipath (ECMP) routing in the plurality of clouds; and
   executing, by the controller, an implementation of the scaling operation for a first cloud of the plurality of clouds corresponding to one of address resolution protocol, IP-based routing, or ECMP routing that is supported by the first cloud, the implementation including operations of: configuring a network interface on a data plane device of the distributed load balancer and configuring an upstream network of the first cloud.

9. The non-transitory computer readable medium of claim 8, further comprising determining an order of the operations of the scaling operation based on a networking infrastructure of the first cloud.

10. The non-transitory computer readable medium of claim 9, wherein the controller first configures the upstream network of the first cloud and then configures the network interface of the data plane device.

11. The non-transitory computer readable medium of claim 10, wherein the first cloud supports only internet protocol (IP)-based routing on a router of the upstream network, and wherein configuring the upstream network comprises configuring a route in the router to the data plane device.

12. The non-transitory computer readable medium of claim 9, wherein the controller first configures the network interface of the data plane device and then configures the upstream network of the first cloud.

13. The non-transitory computer readable medium of claim 12, wherein the first cloud supports only equal cost multipath (ECMP) routing on a router of the upstream network, and wherein configuring the upstream network comprises adding, to the router, a route to the data plane device to a set of routes having equal cost.

14. The non-transitory computer readable medium of claim 8, further comprising:

executing, by the controller, an implementation of the scaling operation for a second cloud of the plurality of clouds, the implementation including only an operation of configuring a network interface on a data plane device of the distributed load balancer.

15. A multi-cloud system, comprising:

a distributed load balancer having a controller and a data plane device, the distributed load balancer configured to balance network traffic received at a virtual address across a plurality of instances of an application;

the controller configured to:

initiate a scaling operation targeting a plurality of clouds in the multi-cloud system;

determine implementations of the scaling operation for the plurality of clouds based on support of at least one of address resolution protocol, internet protocol (IP)-based routing, and equal cost multipath (ECMP) routing in the plurality of clouds; and execute an implementation of the scaling operation for a first cloud of the plurality of clouds corresponding to one of address resolution protocol, IP-based routing, or ECMP routing that is supported by the first cloud, the implementation including operations of: configuring a network interface on a data plane device of the distributed load balancer and configuring an upstream network of the first cloud.

16. The multi-cloud system of claim 15, wherein the controller is further configured to determine an order of the operations of the scaling operation based on a networking infrastructure of the first cloud.

17. The multi-cloud system of claim 16, wherein the controller first configures the upstream network of the first cloud and then configures the network interface of the data plane device.

18. The multi-cloud system of claim 17, wherein the first cloud supports only internet protocol (IP)-based routing on a router of the upstream network, and wherein configuring the upstream network comprises configuring a route in the router to the data plane device.

19. The multi-cloud system of claim 16, wherein the controller first configures the network interface of the data plane device and then configures the upstream network of the first cloud.

20. The multi-cloud system of claim 19, wherein the first cloud supports only equal cost multipath (ECMP) routing on a router of the upstream network, and wherein configuring the upstream network comprises adding, to the router, a route to the data plane device to a set of routes having equal cost.

* * * * *